United States Patent [19]
Nowlin

[11] Patent Number: 6,006,779
[45] Date of Patent: Dec. 28, 1999

[54] FLUID CUTOFF SYSTEM

[76] Inventor: John W. Nowlin, 1329 Bonnie Dr., Tallahassee, Fla. 32304

[21] Appl. No.: 09/133,366

[22] Filed: Aug. 12, 1998

[51] Int. Cl.⁶ .................................................... F16K 31/18
[52] U.S. Cl. ............................................ 137/446; 137/434
[58] Field of Search ..................................... 137/446, 434, 137/409, 440, 386, 410, 416, 420

[56] References Cited

U.S. PATENT DOCUMENTS

| | | | |
|---|---|---|---|
| 2,376,623 | 5/1945 | Romberg | 137/434 |
| 3,005,465 | 10/1961 | Whitlock et al. | 137/409 |
| 4,042,984 | 8/1977 | Butler | 4/200 |
| 4,131,133 | 12/1978 | Huwe | 137/624.11 |
| 4,280,530 | 7/1981 | Yi | 137/624.11 |
| 4,495,960 | 1/1985 | Cartier et al. | 137/446 |
| 4,538,307 | 9/1985 | Barnum et al. | 4/427 |
| 4,718,446 | 1/1988 | Simpson | 137/78.3 |
| 4,796,650 | 1/1989 | Hwang | 137/446 |
| 4,838,296 | 6/1989 | Brooks | 137/78.3 |
| 4,875,498 | 10/1989 | Andrews et al. | 137/78.3 |
| 5,021,939 | 6/1991 | Pulgiese | 364/143 |
| 5,087,886 | 2/1992 | Mann | 324/696 |
| 5,090,443 | 2/1992 | Jacobsen | 137/429 |
| 5,355,122 | 10/1994 | Erickson | 340/602 |
| 5,894,858 | 4/1999 | Schlusselbauer | 137/446 |

*Primary Examiner*—David J. Walczak
*Attorney, Agent, or Firm*—Peter Loffler

[57] ABSTRACT

A fluid cutoff system for preventing fluid flow through a hose whenever a desired amount of fluid has been deposited onto an area is comprised of a tube having a valve therein. An accumulator has a float floatably disposed therein with an extension attached to the float. The extension interacts with the valve such that whenever the float is in a relatively low position the extension holds the valve in an open position and whenever the float is in a relatively high position—corresponding to fluid being deposited in the accumulator—the extension disengages from the valve and the valve closes and prevents water flow through the tube.

38 Claims, 5 Drawing Sheets

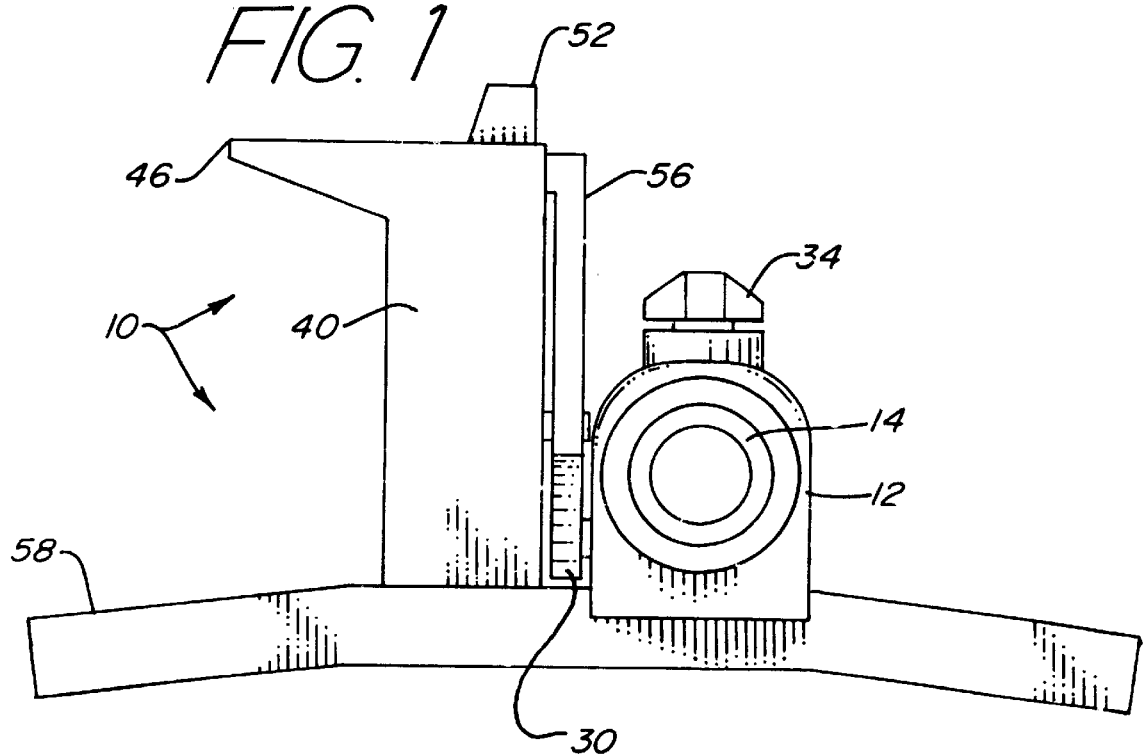
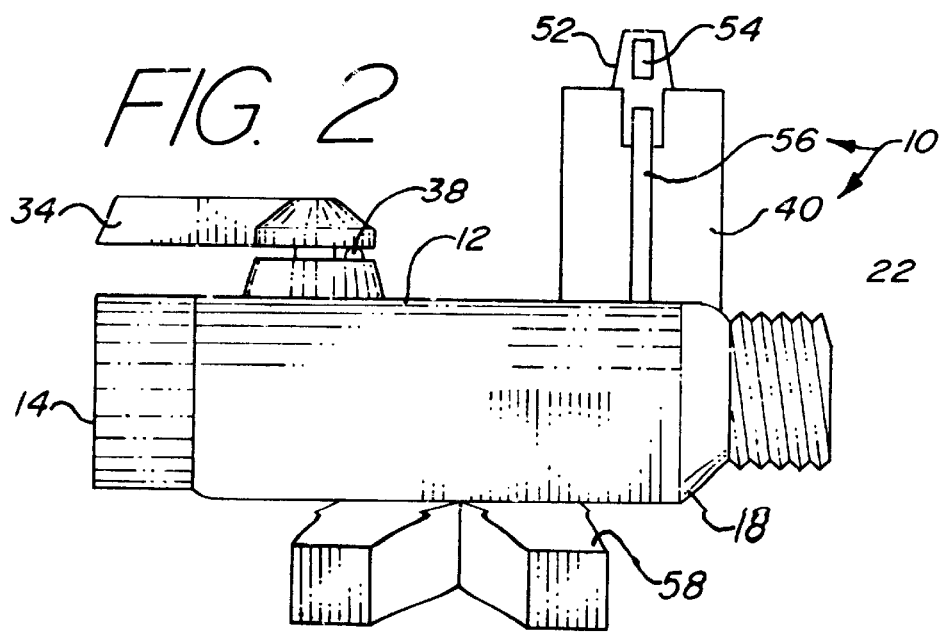

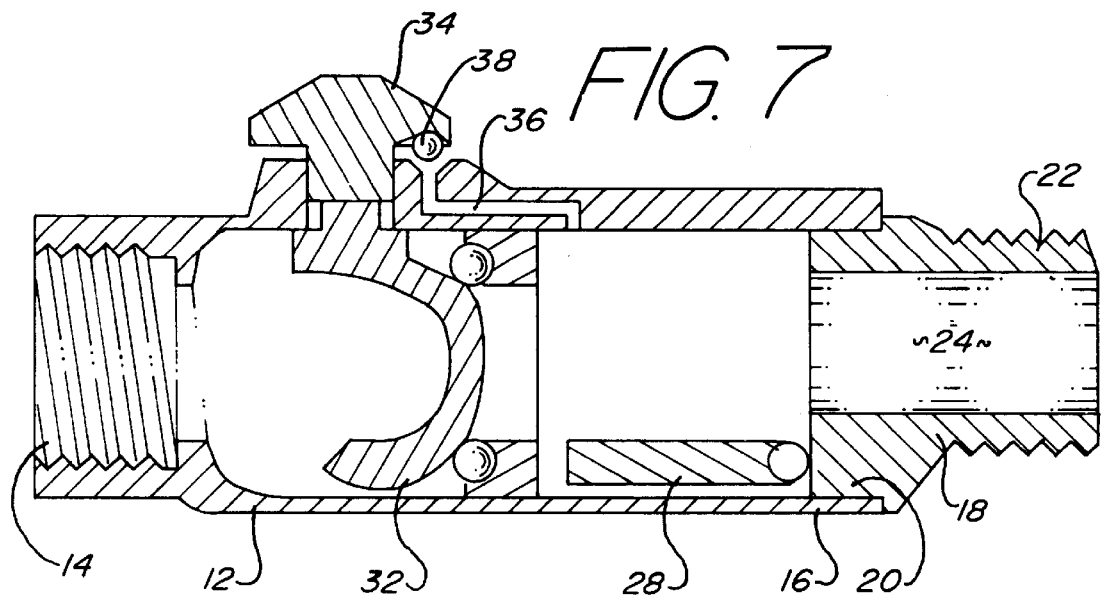
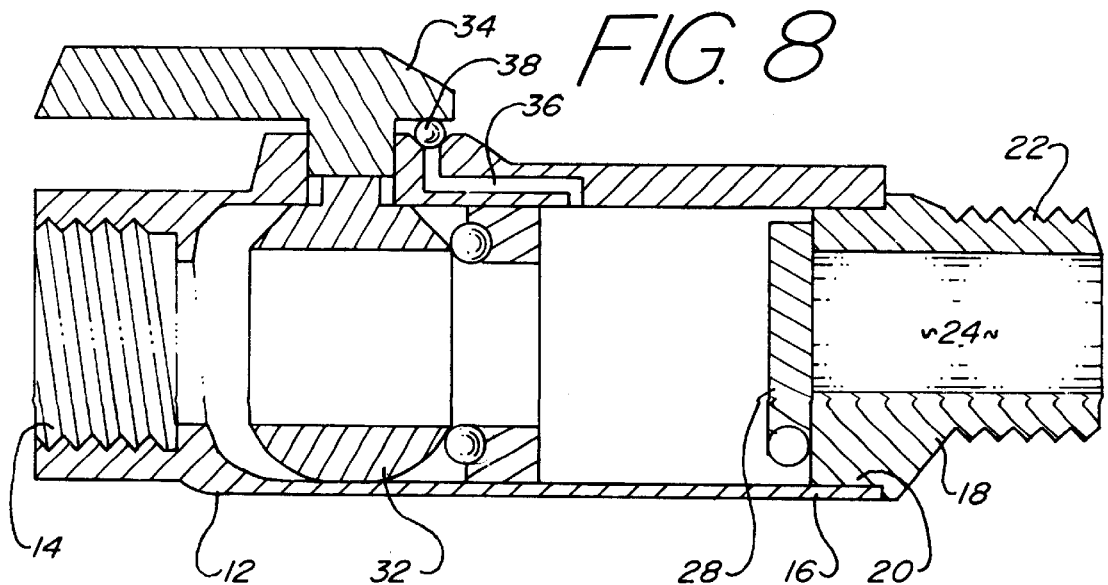

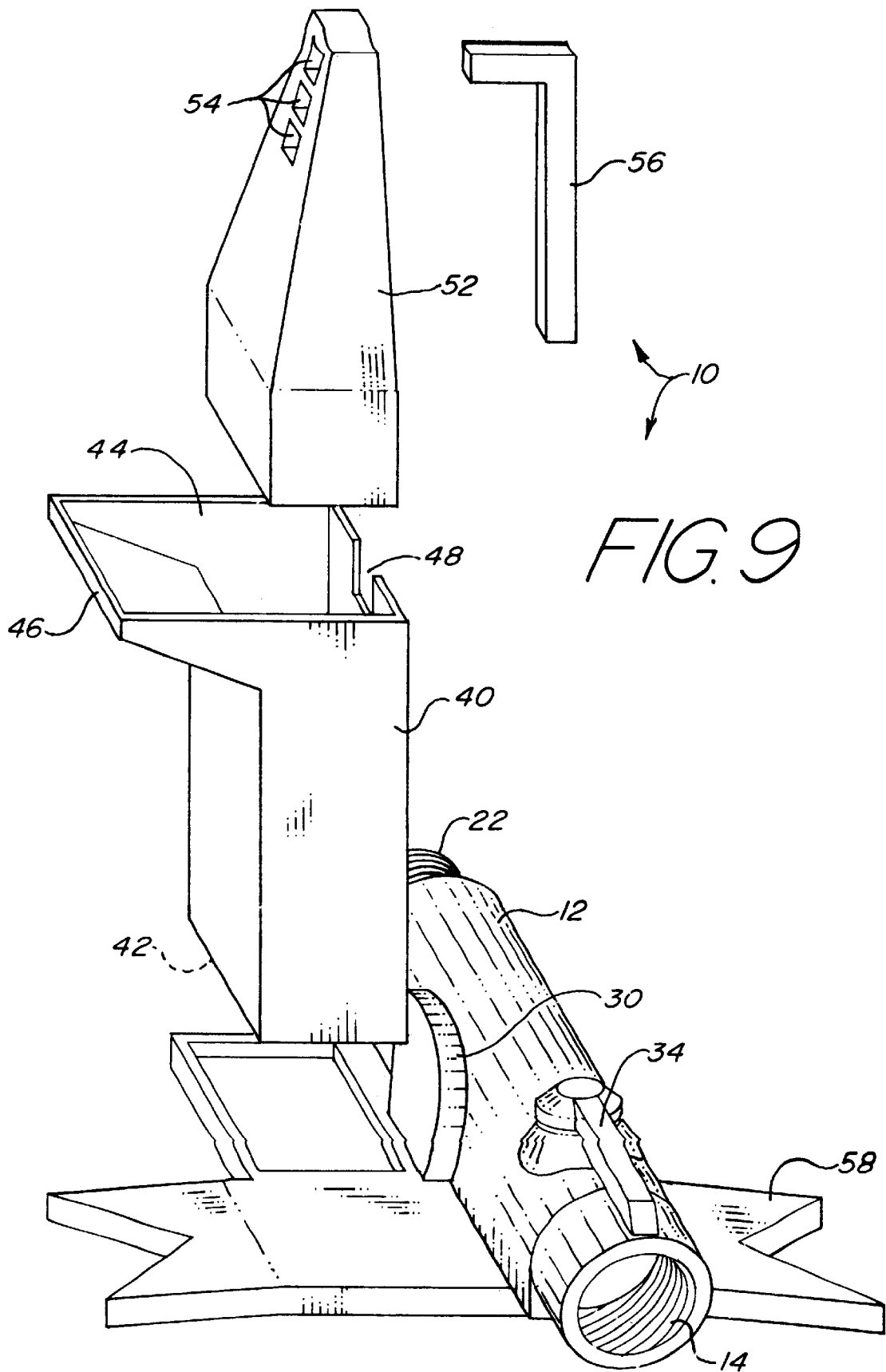

FLUID CUTOFF SYSTEM

BACKGROUND OF THE INVENTION

1. Field of the Invention

The present invention relates to a fluid cutoff system that prevents fluid flow through a hose in response to a given amount of water being deposited in an area.

2. Background of the Prior Art

When watering a lawn or similar area, it is desirable to stop the watering process after a desired amount of water has been deposited on the lawn in order to reduce the necessary consumption of water. This desired amount of water to be deposited can come from the watering process itself or from rain. If a person is attending to the watering process, terminating the process is straightforward. Oftentimes, however, the person watering the lawn turns the system on and attends to other matters, many times leaving the system on unnecessarily for hours.

In order to eliminate the necessary watering of lawns, cutoff systems and moisture management systems have been proposed. Exemplary of such systems are U.S. Pat. No. 5,355,122 to Erickson, U.S. Pat. No. 5,087,886 to Mann, U.S. Pat. No. 5,021,939 to Pulgiese, U.S. Pat. No. 4,919,165 to Lloyd, U.S. Pat. No. 4,875,498 to Andrews et al., U.S. Pat. No. 4,718,446 to Simpson, U.S. Pat. No. 4,280,530 to Yi, and U.S. Pat. No. 4,131,133 to Huwe. These and other systems which teach a number of variations of cutoff systems, each have one or more drawbacks. Many of the prior art systems are complex to manufacture or install making their widespread use less likely. Other systems, rely on the use of electricity which is unappealing to many who do not want to combine an electrical component in a water management system. Furthermore, the use of electricity may require the use of a professional installer.

Therefore, there is a need in the art for a fluid cutoff system that terminates fluid flow through a house upon a predetermined amount of fluid being deposited in a given area that overcomes the drawbacks associated with current state of the art systems. Such a cutoff system must be of relatively simple design and construction and must be relatively easy to install and must not depend on the use of electricity for functionality.

SUMMARY OF THE INVENTION

The fluid cutoff system of the present invention addresses the aforementioned needs in the art. The present invention provides for a cutoff system that is of simple design and construction and is easy to install into an existing hose system. The device is purely mechanical and does not require electricity.

The fluid cutoff system of the present invention is comprised of a tube having a first valve, the valve comprised of a plate rotatably disposed within the tube and a cam operatively connected to the plate and located external of the tube. An accumulator, having a closed bottom and an open top and a lip, is positioned proximate the tube. A float is floatably disposed within the tube. An extension is removably secured to one of a plurality of openings on the float and travels within a notch on the accumulator and is guided by a guide on the accumulator. The extension interacts with the first valve such that when the valve is in the open position, the extension engages the cam and holds the valve open. As fluid accumulates within the accumulator, the float, and hence the extension, rise and the extension disengages from the cam. The fluid pressure within the tube pushes the plate against a connector disposed within the tube thereby preventing fluid flow through the tube.

A base and an optional manual second valve having a knob for operation are also provided. The second valve operates a pressure relief system, comprised of a relief chamber and a ball valve, that relieves pressure within the tube whenever the second valve is closed.

BRIEF DESCRIPTION OF THE DRAWINGS

FIG. 1 is a right side elevation view of the fluid cutoff system of the present invention.

FIG. 2 is a front elevation view of the fluid cutoff system.

FIG. 7 is a sectioned view of the tube of the fluid cutoff system with the first valve in an open position and the second valve in a closed position.

FIG. 8 is a sectioned view of the tube of the fluid cutoff system with the first valve in a closed position and the second valve in an open position.

FIG. 9 is a perspective view, partially exploded, of the fluid cutoff system.

Similar reference numerals refer to similar parts throughout the several views of the drawings.

DESCRIPTION OF THE PREFERRED EMBODIMENT

Figure 3:
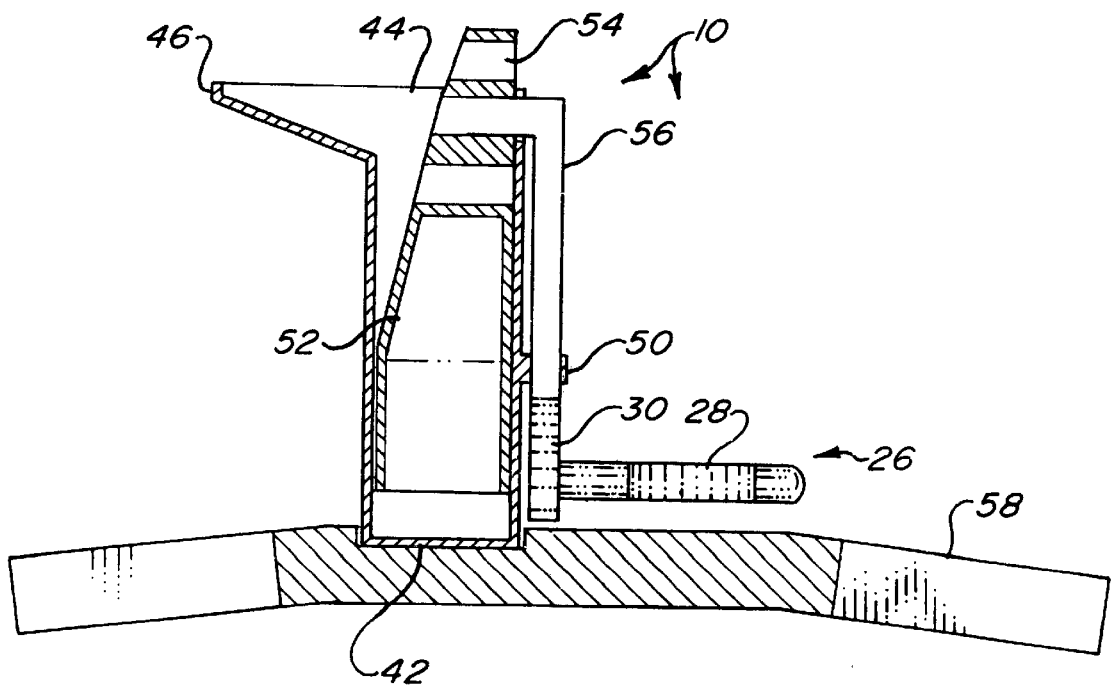
FIG. 3 is a side sectioned of the fluid cutoff system with the first valve in an open position.
Figure 4:
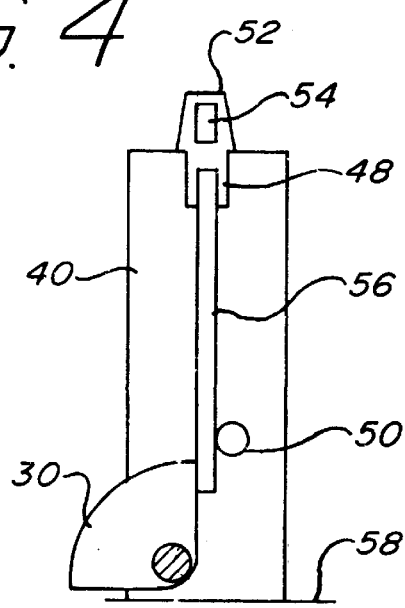
FIG. 4 is a front elevation view of the fluid cutoff system, with elements removed for brevity and clarity, with the first valve in an open position.
Figure 5:
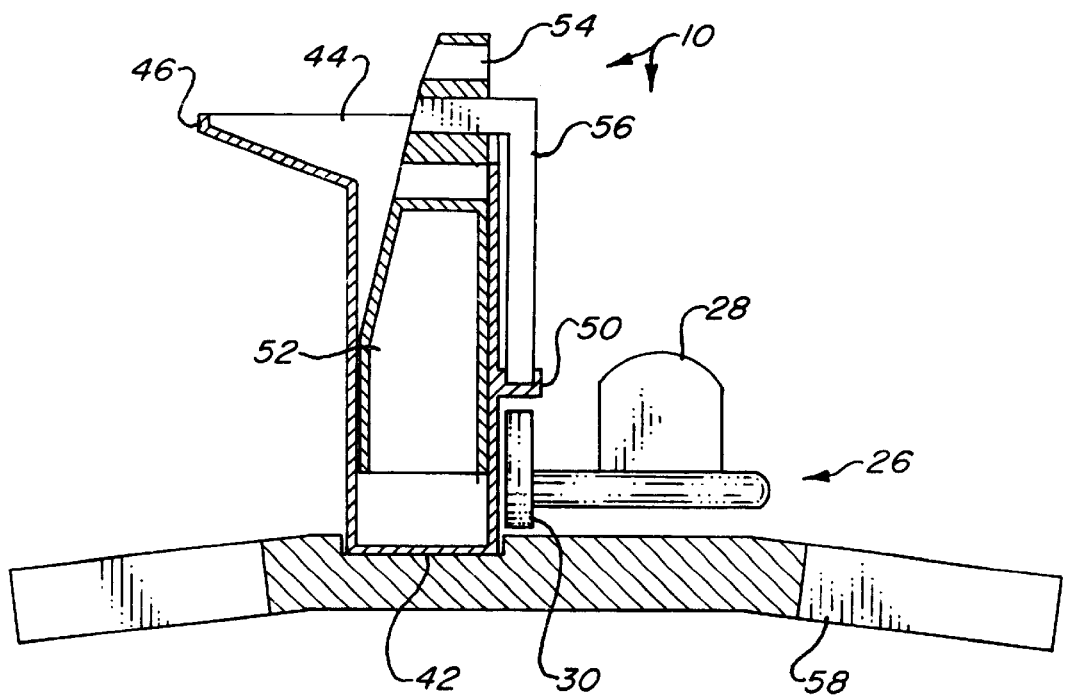
FIG. 5 is a side sectioned of the fluid cutoff system with the first valve in an closed position.
Figure 6:
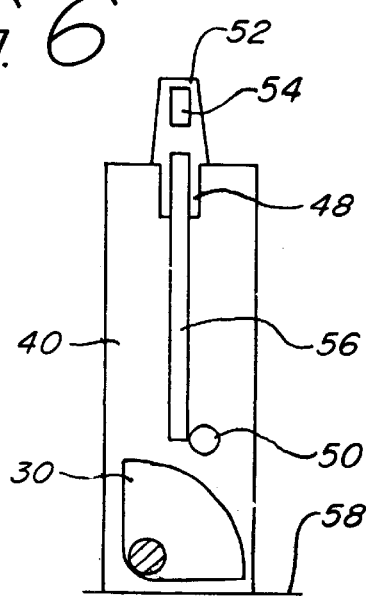
FIG. 6 is a front elevation view of the fluid cutoff system, with elements removed for brevity and clarity, with the first valve in an closed position.

Referring now to the drawings, it is seen that the fluid cutoff system of the present invention, generally denoted by reference numeral 10, is comprised of a tube 12 having a threaded first end 14 and a second end 16. A connector 18 has a third end 20 disposed within the second end 16 of the tube 12, a threaded fourth end 22, and a hollow interior 24. A first valve 26 is secured to the tube 12, the first valve 26 being comprised of a plate 28 rotatably disposed within the tube 12 and a cam 30 operatively connected to the plate 28 and located exterior of the tube 12. The first valve 26 is operative between a first open position permitting fluid through the tube 12 and a first closed position preventing fluid flow through the tube 23. In the first open position of the first valve 26, as best seen in FIGS. 3–4, and 7, the plate 28 is generally horizontally positioned away from the connector 18 thereby permitting fluid to flow through the tube 12 into the hollow interior 24 of the connector 18. In the first closed position of the first valve 26, as best seen in FIGS. 5–6 and 8, the plate 28 abuts against the third end 20 of the connector 18 and prevents fluid flow thereinto.

As seen in FIGS. 1–2 and 7–8, a second valve 32 is secured to the tube 12 and is operative between a second open position (FIG. 8) permitting fluid flow through the tube 12 and a second closed position (FIG. 7) preventing fluid flow through the tube 12. This second valve 32 is a manual valve of any desired design known in the art, having a knob 34 or similar control device, for controlling fluid flow therepast. A pressure relief system, is comprised of a relief chamber 36 and a ball valve 38 which is operated by the second valve 32. Whenever the second valve 32 is in the second open position, the ball valve 38 covers the relief chamber 36 and the pressure relief system is in the closed position thereby maintaining pressure within the tube 12. Whenever the second valve 32 is in the second closed position, the ball valve 38 uncovers the pressure relief system thereby releasing pressure within the tube 12.

An accumulator 40 has a closed bottom 42, an open top 44, a lip 46 secured to the open top 44, a notch 48, and a guide 50. A float 52 having a plurality of openings 54 is floatably disposed within the accumulator 40. An extension 56 is removably secured within one of the plurality of openings 54, and travels within the notch 48 and is guided by the guide 50.

In order to use the fluid cutoff system 10 of the present invention, the accumulator 40 is emptied of any fluid therein and the device 10 is positioned in an area where fluid accumulation monitoring is desired. The first end 14 of the tube 12 is secured, via a hose (not illustrated), to a fluid source and the fourth end 22 of the connector 18 is connected to a fluid discharge device such as a nozzle or sprinkler (neither illustrated). The extension 56 is secured within one of the plurality of openings 54 and the float 52 is placed into the accumulator 40. The first valve 26 is placed into the first open position and the extension 56 is positioned such that it engages the cam 30, thereby preventing rotation of the cam 30 and the plate 28, thereby maintaining the first valve 26 in the first open position. The guide 50 maintains the extension 56 against the cam 30. The second valve 32 is placed into the second open position and watering of the area commences. Fluid enters the device 10 through the first end 14 of the tube 12 passes through the tube 12, enters the hollow chamber 24 of the connector 18 and is discharged through the fourth end 22 of the connector 12 (to the attached discharge device).

As fluid accumulates within the accumulator 40, the float 52 rises with the rising fluid level. Once sufficient fluid accumulates within the accumulator 40, the float 52 rises sufficiently such that the extension 56 disengages from the cam 30. The fluid pressure within the tube 12 acts on the plate 28 and forces the plate 28 against the third end 20 of the connector 18 with the fluid pressure maintaining the plate 28 thereat. This places the first valve 26 into the first closed position thereby terminating the watering process.

If a change to the amount of fluid to be accumulated within the accumulator 40 before the first valve 26 goes into the first closed position is desired, the extension 56 is placed into a different one of the plurality of openings 54. If more fluid is to be accumulated within the accumulator 40 before the first valve 26 is placed into the first closed position, then the extension 56 is moved to a lower opening 54, and if less fluid is to be accumulated within the accumulator 40 before the first valve 26 is placed into the first closed position, then the extension 56 is moved to a higher opening 54.

During any reset function, the second valve 32 is placed into the second closed position so as to open the pressure relief system allowing the first valve 26 to be reset. Furthermore, the accumulator 40 may be removable from the base 58 for easy emptying of the accumulator 40.

While the invention has been particularly shown and described with reference to an embodiment thereof, it will be appreciated by those skilled in the art that various changes in form and detail may be made without departing from the spirit and scope of the invention.

I claim:

1. A fluid cutoff system comprising:

A tube having a first end and a second end;

a first valve secured to the tube and operable between a first open position permitting fluid flow through the tube and a first closed position preventing fluid flow through the tube, the first valve comprised of a plate rotatably mounted within the tube and a cam attached to the plate disposed external of the tube such that the cam rotates with rotation of the plate and the extension engages the cam whenever the first valve is in an open position;

a connector having a third end and a fourth end disposed within the second end such that the plate abuts the connector whenever the first valve is in the closed position;

an accumulator having closed bottom and an open top;

a float disposed within the accumulator; and an extension, attached to the float, engaging the first valve to hold the first valve in the first open position and disengaged from the first valve when the first valve is in the first closed position.

2. The fluid cutoff system as in claim 1 wherein the fourth end is threaded.

3. The fluid cutoff system as in claim 1 wherein the first end is threaded.

4. The fluid cutoff system as in claim 1 wherein the open top of the accumulator has a lip.

5. The fluid cutoff system as in claim 1 further comprising a plurality of openings disposed within the float such that the extension is removably disposed within one of the plurality of openings.

6. The fluid cutoff system as in claim 1 further comprising a notch located on the accumulator such that the extension travels within the notch.

7. The fluid cutoff system as in claim 1 further comprising a guide attached to the accumulator for guiding travel of the extension.

8. The fluid cutoff system as in claim 1 further comprising a base attached to the tube and to the accumulator.

9. The fluid cutoff system as in claim 1 further comprising a second valve disposed within the tube and operable between a second open position permitting fluid flow through the tube and a second closed position preventing fluid flow through the tube.

10. The fluid cutoff system as in claim 9 further comprising a knob operatively connected to the second valve.

11. The fluid cutoff system as in claim 10 further comprising a pressure relief system for relieving pressure from the interior of the tube, the pressure relief system being in a third closed position whenever the second valve is in the second open position and the pressure relief system being in a third open position whenever the second valve is in the second closed position.

12. The fluid cutoff system as in claim 11 wherein the pressure relief system is comprised of:

a relief chamber, having a fifth end and a sixth end, extending between the interior of the tube and the exterior;

and a ball valve, attached to the knob, that covers the fifth end whenever the pressure relief system is in the third closed position and does not cover the fifth end whenever the pressure relief system is in the third open position.

13. A fluid cutoff system comprising:

A tube having a first end and a second end;

a first valve secured to the tube and operable between a first open position permitting fluid flow through the tube and a first closed position preventing fluid flow through the tube;

an accumulator having closed bottom and an open top;

a float disposed within the accumulator; and a plurality of openings disposed within the float such that the extension is removably disposed within one of the plurality of openings;

an extension, attached to the float, engaging the first valve to hold the first valve in the first open position and disengaged from the first valve when the first valve is in the first closed position.

14. The fluid cutoff system as in claim 13 wherein the first valve is comprised of:

a plate rotatably mounted within the tube; and a cam attached to the plate disposed external of the tube such that the cam rotates with rotation of the plate and the extension engages the cam whenever the first valve is in an open position.

15. The fluid cutoff system as in claim 14 further comprising a connector having a third end and a fourth end disposed within the second end such that the plate abuts the connector whenever the first valve is in the closed position.

16. The fluid cutoff system as in claim 15 wherein the fourth end is threaded.

17. The fluid cutoff system as in claim 13 wherein the first end is threaded.

18. The fluid cutoff system as in claim 13 wherein the open top of the accumulator has a lip.

19. The fluid cutoff system as in claim 13 further comprising a notch located on the accumulator such that the extension travels within the notch.

20. The fluid cutoff system as in claim 13 further comprising a guide attached to the accumulator for guiding travel of the extension.

21. The fluid cutoff system as in claim 13 further comprising a base attached to the tube and to the accumulator.

22. The fluid cutoff system as in claim 13 further comprising a second valve disposed within the tube and operable between a second open position permitting fluid flow through the tube and a second closed position preventing fluid flow through the tube.

23. The fluid cutoff system as in claim 22 further comprising a knob operatively connected to the second valve.

24. The fluid cutoff system as in claim 23 further comprising a pressure relief system for relieving pressure from the interior of the tube, the pressure relief system being in a third closed position whenever the second valve is in the second open position and the pressure relief system being in a third open position whenever the second valve is in the second closed position.

25. The fluid cutoff system as in claim 24 wherein the pressure relief system is comprised of:

a relief chamber, having a fifth end and a sixth end, extending between the interior of the tube and the exterior;

and a ball valve, attached to the knob, that covers the fifth end whenever the pressure relief system is in the third closed position and does not cover the fifth end whenever the pressure relief system is in the third open position.

26. A fluid cutoff system comprising:

A tube having a first end and a second end;

a first valve secured to the tube and operable between a first open position permitting fluid flow through the tube and a first closed position preventing fluid flow through the tube;

an accumulator having closed bottom and an open top;

a float disposed within the accumulator;

a second valve disposed within the tube and operable between a second open position permitting fluid flow through the tube and a second closed position preventing fluid flow through the tube; and an extension, attached to the float, engaging the first valve to hold the first valve in the first open position and disengaged from the first valve when the first valve is in the first closed position.

27. The fluid cutoff system as in claim 26 wherein the first valve is comprised of:

a plate rotatably within the tube; and a cam attached to the plate disposed external of the tube such that the cam rotates with rotation of the plate and the extension engages the cam whenever the first valve is in an open position.

28. The fluid cutoff system as in claim 27 further comprising a connector having a third end and a fourth end disposed within the second end such that the plate abuts the connector whenever the first valve is in the closed position.

29. The fluid cutoff system as in claim 28 wherein the fourth end is threaded.

30. The fluid cutoff system as in claim 26 wherein the first end is threaded.

31. The fluid cutoff system as in claim 26 wherein the open top of the accumulator has a lip.

32. The fluid cutoff system as in claim 26 further comprising a plurality of openings disposed within the float such that the extension is removably disposed within one of the plurality of openings.

33. The fluid cutoff system as in claim 26 further comprising a notch located on the accumulator such that the extension travels within the notch.

34. The fluid cutoff system as in claim 26 further comprising a guide attached to the accumulator for guiding travel of the extension.

35. The fluid cutoff system as in claim 26 further comprising a base attached to the tube and to the accumulator.

36. The fluid cutoff system as in claim 35 further comprising a knob operatively connected to the second valve.

37. The fluid cutoff system as in claim 36 further comprising a pressure relief system for relieving pressure from the interior of the tube, the pressure relief system being in a third closed position whenever the second valve is in the second open position and the pressure relief system being in a third open position whenever the second valve is in the second closed position.

38. The fluid cutoff system as in claim 37 wherein the pressure relief system is comprised of:

a relief chamber, having a fifth end and a sixth end, extending between the interior of the tube and the exterior;

and a ball valve, attached to the knob, that covers the fifth end whenever the pressure relief system is in the third closed position and does not cover the fifth end whenever the pressure relief system is in the third open position.

* * * * *